(12) United States Patent
Cha et al.

(10) Patent No.: US 8,200,695 B2
(45) Date of Patent: Jun. 12, 2012

(54) DATABASE FOR UPLOADING, STORING, AND RETRIEVING SIMILAR DOCUMENTS

(75) Inventors: Wan Kyu Cha, Kyunggi-do (KR); Jeong Joong Kim, Seoul (KR); Han Joon Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 659 days.

(21) Appl. No.: 11/621,820

(22) Filed: Jan. 10, 2007

(65) Prior Publication Data

US 2007/0244881 A1 Oct. 18, 2007

(30) Foreign Application Priority Data

Apr. 13, 2006 (KR) .......... 10-2006-0033658
Apr. 13, 2006 (KR) .......... 10-2006-0033663

(51) Int. Cl.
*G06F 17/30* (2006.01)

(52) U.S. Cl. .......... 707/772; 707/748; 707/765

(58) Field of Classification Search .......... 707/748, 707/765, 772
See application file for complete search history.

(56) References Cited

U.S. PATENT DOCUMENTS

| | | | | |
|---|---|---|---|---|
| 6,026,388 | A * | 2/2000 | Liddy et al. .......... | 707/1 |
| 7,409,632 | B1 * | 8/2008 | DiRienzo .......... | 715/226 |
| 2002/0018077 | A1 * | 2/2002 | Powlette .......... | 345/744 |
| 2002/0169743 | A1 * | 11/2002 | Arnold et al. .......... | 707/1 |
| 2003/0014398 | A1 * | 1/2003 | Ohta et al. .......... | 707/3 |
| 2003/0018669 | A1 * | 1/2003 | Kraft .......... | 707/530 |
| 2003/0065658 | A1 * | 4/2003 | Matsubayashi et al. .......... | 707/4 |
| 2003/0101177 | A1 * | 5/2003 | Matsubayashi et al. .......... | 707/6 |
| 2003/0140309 | A1 * | 7/2003 | Saito et al. .......... | 715/500 |
| 2004/0068495 | A1 * | 4/2004 | Inaba et al. .......... | 707/3 |
| 2004/0088713 | A1 * | 5/2004 | Myllymaki et al. .......... | 719/315 |
| 2005/0022114 | A1 * | 1/2005 | Shanahan et al. .......... | 715/513 |
| 2006/0048043 | A1 * | 3/2006 | Kikuchi .......... | 715/501.1 |
| 2007/0073748 | A1 * | 3/2007 | Barney .......... | 707/101 |

FOREIGN PATENT DOCUMENTS

| | | |
|---|---|---|
| CN | 1517912 | 8/2004 |
| JP | 2005-208737 | 8/2005 |

OTHER PUBLICATIONS

Albert et al, "Direct validation of citation counts as indicators of industrially important patents", Dec. 1990, Research Policy, vol. 20, pp. 251-259.*

(Continued)

*Primary Examiner* — Khanh Pham
(74) *Attorney, Agent, or Firm* — McKenna Long & Aldridge LLP (57) ABSTRACT

Provided is a system of retrieving a document. The system includes a DB storing a document, a document feature writing unit, a query input unit, a keyword extraction unit, a weighting unit, a document retrieving unit, and an output unit. The document feature writing unit extracts attribute information of the document stored in the document DB and writes an index for the document based on the attribute information. The query input unit receives a query input by a user. The keyword extraction unit extracts a keyword from the query. The weighting unit assigns a weight to the extracted keyword using the index. The document retrieving unit retrieves a similar document using the keyword with the assigned weight. The output unit displays the similar document retrieved by the document retrieving unit to a user.

10 Claims, 9 Drawing Sheets

OTHER PUBLICATIONS

Harhoff et al, "Citation Frequency and the Value of Patented Innovation", Aug. 1997, Discussion Paper No. 97-27, p. 1-11.*

Putnam, "The Value of International Patent Rights", May 1996, Dissertation, UMI, p. 1-142.*

U.S. Appl. No. 11/621,870 to Cha et al., which was filed Jan. 10, 2007.

U.S. Appl. No. 11/621,817 to Cha et al., which was filed Jan. 10, 2007.

English language Abstract of JP 2005-208737.

* cited by examiner

Document 1 (35, 19, 15, 13, ....., 1) (A, B, C, D, ......, M)

Document 2 (24, 22, 20, 15, ....., 1) (B, C, A, D, ......, I)

Document 3 (27, 15, 10, 8, ....., 1) (B, A, C, K, ......D)

⋮ ⋮

Document 100 (33, 21, 15, 15, ....., 1) (O, P, Q, C, ......, Z)

| No | SELECT | KEYWORD | WEIGHT ▼ | EXPANDED KEYWORD |
|---|---|---|---|---|
| 1 | ☐ | optical | 18 | |
| 2 | ☐ | prism | 15 | |
| 3 | ☐ | beam | 13 | |
| 4 | ☐ | axis | 10 | |
| 5 | ☐ | orthogonal | 8 | |
| 6 | ☐ | angular | 7 | |
| 7 | ☐ | device | 6 | |
| 8 | ☐ | stability | 6 | |
| 9 | ☐ | relation | 5 | |
| 10 | ☐ | input | 4 | |
| 11 | ☐ | movement | 4 | |
| 12 | ☐ | body | 4 | |
| 13 | ☐ | output | 4 | |
| 14 | ☐ | structure | 3 | |

[CONFIRM] [ADD] [DELETE]

620 → DOCUMENT RETRIEVAL REQUEST SECTION

| SELECT | No | Title | IPC | Appl.No. | Assignee | SIMILARITY(%) | | | |
|---|---|---|---|---|---|---|---|---|---|
| | | | | | | ABSTRACT | SPECIFICATION | CLAIM | WHOLE SPECIFICATION |
| ☑ | 1 | Optical beam reconfiguring device and optical | G02B_005/4 | 1996-614787 | SOL, Inc. (San | 57.09 | 57.21 | 57.93 | 58.16 |
| ☑ | 2 | Light deflecting device | G02B_026/08|0 | 1992-969397 | Crosfield Elect | 40.81 | 55.66 | 55.04 | 55.94 |
| ☑ | 3 | Method and apparatus for anamorphically sha | G02B_013/10|0 | 1965-759035 | Eastman Koda | 41.97 | 55.84 | 54.26 | 55.35 |
| ☑ | 4 | Polarization rotator with frequency shifting pr | G01B_009/02|0 | 1993-083845 | Hughes Aircre | 41.57 | 53.81 | 54.30 | 52.20 |
| ☐ | 5 | Method and apparatus for anamorphically sha | G02B_013/10|0 | 1989-292720 | Verbatim Corp | 51.59 | 54.95 | 54.60 | 55.11 |
| ☐ | 6 | Passive error compensating device for optica | G02B_027/14|0 | 1977-824529 | The Perkin-Elrr | 46.26 | 52.69 | 53.82 | 54.62 |
| ☐ | 7 | Threshold, high power laser beam scannin | G02B_026/08|0 | 1992-890452 | Eastman Koda | 46.61 | 53.73 | 54.98 | 54.24 |
| ☐ | 8 | Optical beam expander for dye laser | H01S_00/02 | 1977-781146 | Molectron Cor | 19.24 | 55.22 | 53.76 | 54.12 |
| ☐ | 9 | Light beam-splitter | G02B_027/10|0 | 1983-561117 | Crosfield Elect | 41.73 | 52.98 | 49.17 | 53.84 |
| ☐ | 10 | Potical beam splitter prism | G02B_027/14|0 | 1985-796331 | GTE Laboratory | 55.18 | 48.77 | 51.84 | 52.76 |
| ☐ | 11 | Apparatus to transform a single laser beam in | G02B_027/10|0 | 1974-469947 | Zygo Corporal | 45.89 | 49.58 | 52.93 | 52.21 |
| ☐ | 12 | Optical beam expander for dye laser | H01S_003/08 | 1976-676233 | Molectron Corj | 19.24 | 45.22 | 52.74 | 52.07 |
| ☐ | 13 | Achromatic anamorphic prism pair | G02B_005/04|0 | 1994-201662 | New Focus, Ir | | | | |

DATABASE FOR UPLOADING, STORING, AND RETRIEVING SIMILAR DOCUMENTS

BACKGROUND OF THE INVENTION

1. Field of the Invention

The present invention relates to a system and a method for retrieving documents capable of retrieving documents having a predetermined similarity to a query input by a user, and a user interface provided to a user to retrieve similar documents.

2. Description of the Related Art

Recently, a document retrieval system has been widely used, which processes a great amount of document information to extract and provide only information that a user requests.

That is, document retrieval or information retrieval means that a user retrieves desired document or information from a great amount of documents or information. In order to retrieve documents or information, keywords are processed for a natural language text, weight is assigned to each keyword, and retrieving and ordering are conducted.

A document retrieval system of a related art just receives a query of a user and outputs a common result extracted from a common system to user. Since a general retrieval system classifies documents according to an area of the query received from a user, it is difficult to provide a user with information customized to his or her taste and character.

Also, since the related art system retrieves desired information only according to a query input by a user, a mistake may be made in determining the retrieving range. Therefore, a difference may be generated between information desired by a user and the retrieval result, degrading the accuracy and reliability of the retrieval result.

In addition, since the related art system depends upon a retrieval system used by sites providing information to retrieve the query received from a user, the retrieved information lacks the accuracy and it is difficult to provide information in real time. However, documents that should be retrieved as soon as it is generated or before a long time elapses, such as patent documents, requires an accessing method to the documents and a retrieving method customized to a user.

SUMMARY OF THE INVENTION

Accordingly, the present invention is directed to a system, a method and a user interface for retrieving documents that substantially obviate one or more problems due to limitations and disadvantages of the related art.

An object of the present invention is to provide a system, a method, and a user interface for retrieving documents capable of inputting a query through various routes such as input of a sentence and attachment of a file.

Another object of the present invention is to provide a system, a method, and a user interface for retrieving documents capable of retrieving another documents similar to retrieved documents using the retrieved documents as a query.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system of retrieving a document, the system including: a database storing a document; a document feature writing unit extracting attribute information of the document stored in the document database and writing an index for the document based on the attribute information; a query input unit receiving a query input by a user; a keyword extraction unit extracting a keyword from the query; a weighting unit assigning a weight to the extracted keyword using the index; a document retrieving unit retrieving a similar document using the keyword with the assigned weight; and an output unit displaying the similar document retrieved by the document retrieving unit to a user.

In another aspect of the present invention, there is provided a method of retrieving a document, the method including: receiving a query input by a user through a query input unit; extracting a keyword from the query; weighting each keyword; and retrieving a similar document based on the weighted keyword. Here, the weight assigned to the keyword reflects an occurrence frequency of the keyword of each document using an index of feature information of documents stored in a document database.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
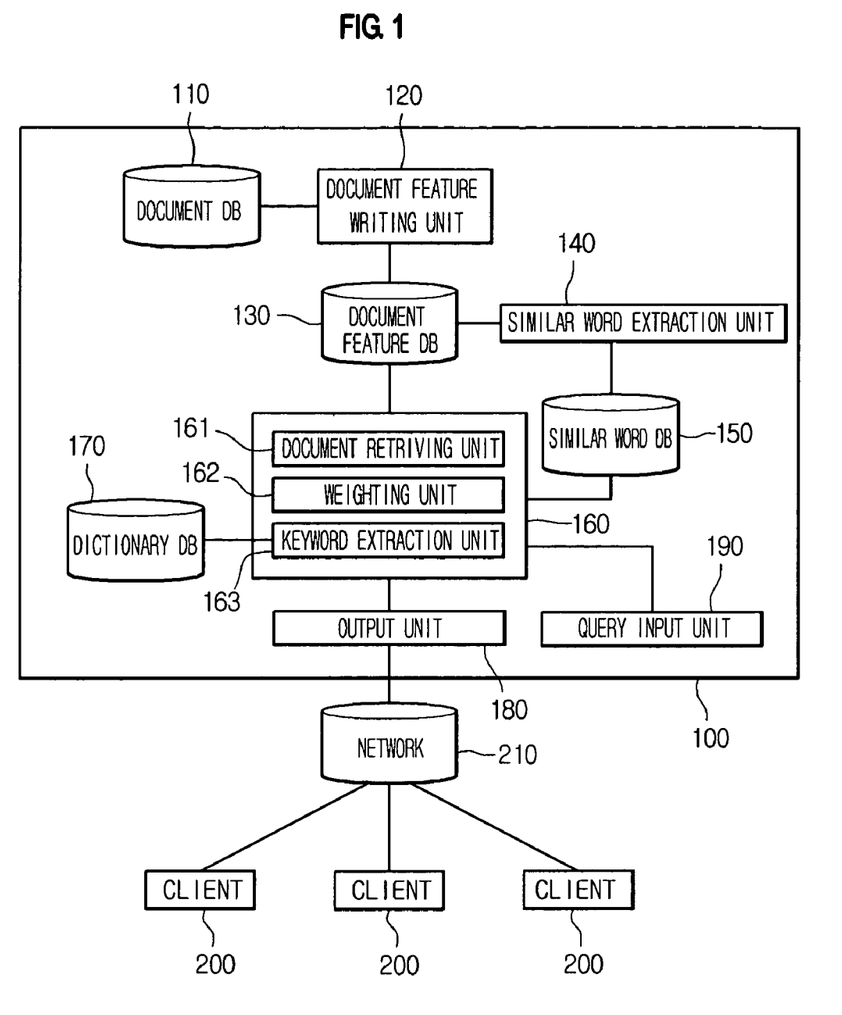
FIG. 1 is a block diagram for illustrating a document retrieval system according to an embodiment of the present invention.

FIG. 1 is a block diagram for illustrating a document retrieval system according to an embodiment of the present invention.

Referring to FIG. 1, the document retrieval system according to an embodiment of the present invention includes clients 200 where a user inputs a query for retrieving documents or a retrieval result of similar documents with respect to the query, and a retrieval system 100 connected with the clients 200 through a network 210 to retrieve similar documents with respect to a query input by a user.

The client 200 includes an input unit that a user uses to transmit a predetermined query to the retrieval system 100, and an output unit for receiving document information transmitted from the retrieval system 100 to display the information to a user.

A communication medium between the retrieval system 100 and the client 200 includes various communication networks such as Internet and LAN.

The retrieval system 100 extracts a keyword from a query, retrieves similar documents using the extracted keyword, and decides the similarity of the retrieved similar documents. The retrieval system 100 includes a query input unit 190, a similar document retrieving part 160, a document database (DB) 110, a document feature writing unit 120, a document feature DB 130, a similar word extraction unit 140, a similar word DB 150, and a dictionary DB 170.

However, hardware of the retrieval system 100 is not limited to a specific structure. For example, the retrieval system 100 may be realized as a computer including a CPU or a memory device such as a ROM, a RAM, and a hard disk.

A 'query' of terms used in the present invention means a text input to select a part of a document from the document DB 110, the document feature DE 130, the similar word DR 150, or the dictionary DR 170, and includes a plurality of queries of a logical expression or a natural language.

In addition, the 'query' used in the present invention does not mean just only a text input by a user. For example, the query may be a specific file when a user retrieves documents similar to a text recorded in the specific file. Also, the query may be a retrieved document when a user retrieves documents similar to the retrieved document.

However, a 'query' and a 'keyword' may be sometimes used in turns in descriptions of the present invention.

The document DB 110 of the present invention mainly stores laid-open patent documents or registered patent documents, but should be not limited thereto. Hereinafter, a method of retrieving similar documents having a predetermined similarity to an input query from documents stored in the document DB 110 will be described on the supposition that laid-open patent documents or registered patent documents are stored in the document DB 110.

A plurality of patent documents are stored in the document DB 110, and although not shown, patent documents may be obtained from another web server connected with a network through a web robot.

The document feature writing unit 120 extracts attribute information of documents from the documents stored in the document DB 110, and indexes are written about the documents based on the attribute information. That is, the document feature writing unit 120 obtains a text from the documents stored in the document DB 110 to supply index information on an occurrence frequency of each keyword to the document feature DB 130.

When a predetermined query is input through the query input unit 190 or when a new document is supplied to the document DB 110, the document feature writing unit 120 may write the feature of the corresponding document.

Next, the document feature writing unit 120 writes an index file for each document stored in the document DB 110 and determines a feature vector for each document using the index file.

The above-mentioned operation will now be described with reference to FIG. 2.

Figure 2:
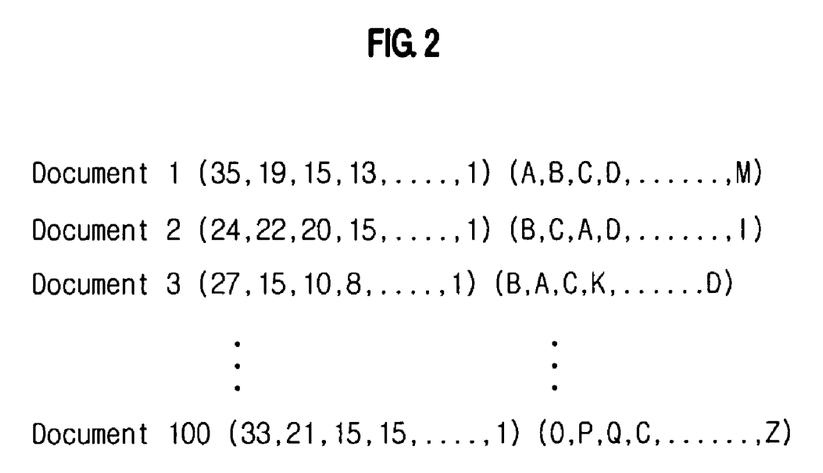
FIG. 2 is a view illustrating attribute information of each document.

FIG. 2 is a view illustrating attribute information of each document.

The attribute information of the documents illustrated in FIG. 2 may be written in a form of an index file by the document feature writing unit 120, and the written index files are stored in the document feature DB 130.

The document feature writing unit 120 may determine a feature vector of each document using the index files stored in the document feature DB 130, and the feature vectors may be stored in the document feature DB 130.

FIG. 2 illustrates information on occurrence frequencies of keywords (A, B, C, D, M, I, K, O, P, Q, Z) in each document. Here, A means a word such as a noun, a proper noun, and a compound noun, and does not mean an alphabet 'A'. For example, keywords A, B, C, and D are included 35 times, 19 times, 15 times, and 13 times in Document 1, respectively. The keywords are arranged from highest to lowest frequency in an occurrence frequency table of keywords included in each document, as illustrated in FIG. 2.

A feature vector of each document or a similar word of each keyword may be extracted using the index files.

Extraction of a similar word of the keywords will be described through the similar word extraction unit 140 and the similar word DB 150 to be described later. Hereinafter, a structure of extracting a feature vector of each document will now be described.

When a query input by a user using the query input unit 190 is transmitted or a new document is supplied to the document DB 110, the similar word extraction unit 140 may extract a similar word (or a related term).

In this case, the similar word extraction unit 140 extracts a similar word from each document stored in the document DB 110, and may use the index file of each document as illustrated in FIG. 2.

In the extraction of the similar word by the similar word extraction unit 140, documents including keywords having a predetermined relativity to an input query as well as the query input by a user are retrieved, improving the reliability for the retrieved documents.

The similar word extraction unit 140 extracts a feature keyword of each document from attribute information of each document written as the index file as illustrated in FIG. 2.

For example, keywords A, B, C, and D may be extracted as feature keywords from highest to lowest occurrence frequency from Document 1. Here, the number of feature keywords extracted from the index file of each document may be changed by an administrator of the retrieval system 100 any time, and thus there is no limit in the number of the feature keywords.

That is, the similar word extraction unit 140 determines a feature vector having evaluation values of keywords of each document as factors. For example, when the total number of keywords included in each document is n, a feature vector of each document is represented as a vector of an n-dimensional space by Equation (1).

$$\text{Feature vector} = (\text{an evaluation value } w1 \text{ of a keyword } A \ w1, \text{ an evaluation value } w2 \text{ of a keyword } B \ldots, \text{ an evaluation value } wn \text{ of a word } n) \quad (1)$$

For example, tf*idf scheme disclosed in the document (Salton, G:Automatic Text Processing: The transformation, Analysis, and Retrieval of Information by Computer, Addison-Wesley) may be used in an arithmetic of an evaluation value. According to the tf*idf method, in the n-dimensional feature vector corresponding to Document 1, the value except for 0 is calculated for a factor corresponding to a keyword included in Document 1, and the value 0 is calculated for a factor corresponding to a keyword not included in Document 1 (a word having a frequency 0).

In this regard, an evaluation value of a keyword as a factor of the feature vector may be a frequency of each keyword included in each document.

For example, keywords A, B, and C of Document 1 may be clustered as similar words by the similar word extraction unit 140, and the clustered similar words are stored in the similar word DB 150.

That is, predetermined keywords A and B are clustered by the similar word extraction unit 140, and the clustered keywords A and B are stored in the similar word DB 150.

When any one of keywords A and B is included in keywords extracted by the keyword extraction unit 163, the document retrieving unit 161 retrieves similar documents including the other one.

Therefore, the retrieval is not definitely performed for extracted keywords, and similar documents may be retrieved based on the attribute of documents stored in the document DB 110.

When a keyword A is included in a query input using the query input unit 190, documents including keywords B and C together with the keyword A may be retrieved when retrieving similar documents.

As described above, an index file is written for each document stored in the document DB 110, and similar words are extracted using the index file. Hereinafter, retrieval of similar documents with respect to a query input by a user will be described in detail.

First of all, document retrieval in the case where a user inputs a query in sentence units will be described.

Figure 3:
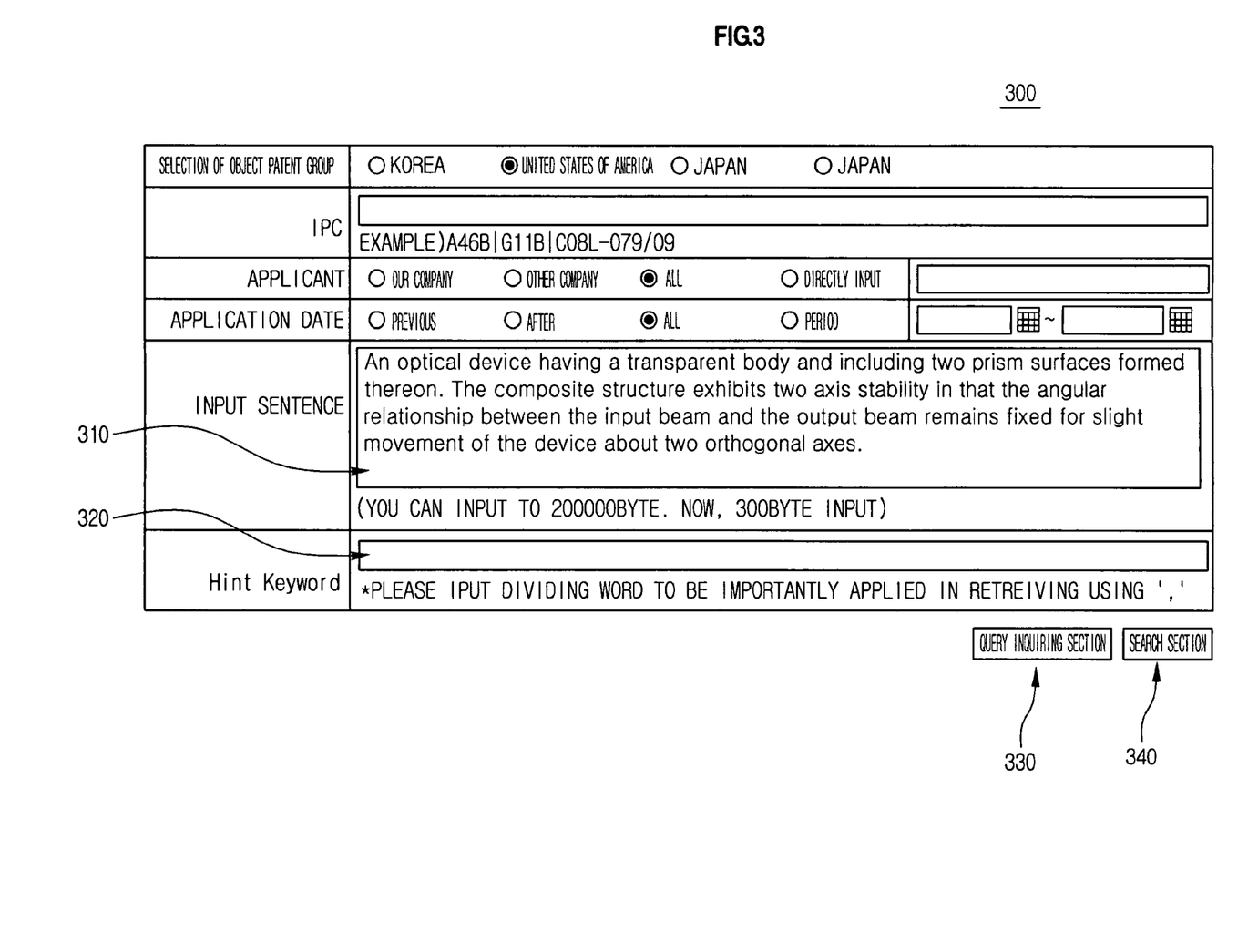
FIG. 3 is a view illustrating a first user interface according to an embodiment of the present invention.

FIG. 3 illustrates a first embodiment of a user interface provided by the retrieval system 100 such that a user may input a query in sentence units through the client 200.

The retrieval system 100 includes an output unit 180 forming a user interface to be transferred to the client 200, and a first user interface 300 provided by the output unit 180 is illustrated in FIG. 3.

The first user interface 300 includes a sentence input section 310 where a user inputs a query in sentence units, and a hint input section 320 where a user inputs a predetermined query to assign a higher weight to a specific keyword.

The first user interface 300 further includes a query inquiring section 330 allows a user to check a keyword extracted from queries input to the sentence input section 310 and the hint input section 320.

Here, when a user inputs the query inquiring section 330, the retrieval system 100 receives queries input in the sentence input section 310 and the hint input section 320, extracts keywords from the received queries, and assigns a weight (or an evaluation value) to each extracted keyword.

Also, a search section 340 is provided such that a user requests retrieval of similar documents.

A method of weighting extracted keywords will now be described in detail.

Figure 5:
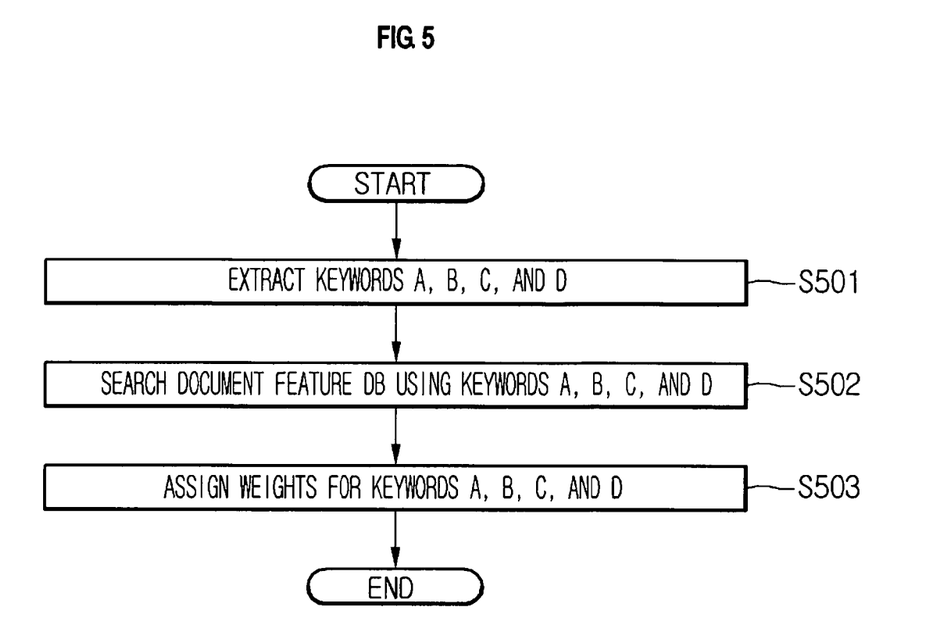
FIG. 5 is a flowchart for illustrating a method of assigning weights to the extracted keywords.

FIG. 5 is a flowchart for illustrating a method of weighting extracted keywords.

When a query in sentence units input by a user is received through the query input unit 190 of the retrieval system 100, the keyword extraction unit 163 of the similar document retrieving part 160 extracts keywords.

In this case, the keyword extraction unit 163 extracts words included in a query input in sentence units using the dictionary DB 170 based on a morphologic analysis, and selects the words as keywords for the input query.

For example, when keywords A, B, C, and D are extracted from the input query by the above-mentioned method (S501), a weighting unit 162 of the similar document retrieving part 160 retrieves the index file stored in the document feature DB 130 using the extracted keywords A, B, C, and C (S502).

When the index file including the extracted keywords A, B, C, and D exists, (for example, Document 1 illustrated in FIG. 2), a weight for each keyword may be assigned based on the occurrence frequencies of the keywords A, B, C, and D in the document. When a plurality of index files include the keywords A, B, C, and D, average values of the occurrence frequencies of the keywords A, B, C, and D in the respective documents may be calculated as weights of the keywords (S503).

When there is no index file including all of the keywords A, B, C, and D, a weight may be assigned using the following method.

Weights may be assigned to the keywords A, B, C, and D based on a ratio between the number of documents of which the keyword A has the highest occurrence frequency and the number of documents of which the keyword B has the highest occurrence frequency.

Also, weights may be assigned to the keywords A, B, C, and D based on a ratio of words constituting the index files stored in the document feature DB 130. For example, weights may be assigned to the keywords A, B, C, and D using a ratio of the number of the keywords A, the number of the keywords B, etc. stored in the document feature DB 130.

In the assignment of the weights for the extracted keywords, the highest weight is assigned to the keyword input through the hint input section 320.

The keywords extracted from the query input through the sentence input section 310 and the hint input section 320 and the weights assigned to the keywords are transferred to the client 200 through the output unit 180.

Figure 4:
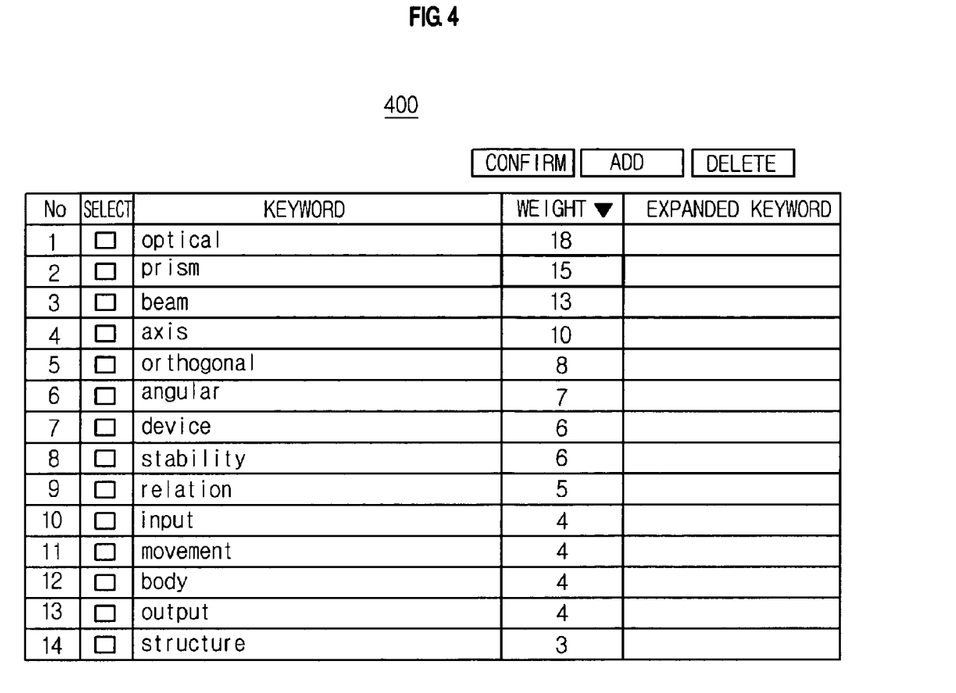
FIG. 4 is a view illustrating a user interface that shows extracted keywords and weights of each keyword.

When a user selects the query inquiring section 330 of the first user interface 300 illustrated in FIG. 3, the extracted keywords and the weights assigned to the keywords are displayed as illustrated in FIG. 4.

A user may modify each keyword and weight illustrated in FIG. 4 through an input unit of the client 200, and thereby a user can establish desired retrieval more accurately.

In particular, each weight assigned to each keyword is used as an occurrence frequency of the corresponding keyword for the document.

For example, as illustrated in FIG. 4, when a weight of 'prism' is 15 and a weight of 'axis' is 10, the document retrieving unit 161 of the similar document retrieving part 160 retrieves documents including the frequency of 'prism' 1.5 times higher than the frequency of 'axis'.

Here, the document retrieving unit 161 retrieves similar documents with reference to the index file stored in the document feature DB 130, as described above.

Next, a process of retrieving another similar documents using the documents retrieved by the similar document retrieving part 160 will be described.

Figure 6:
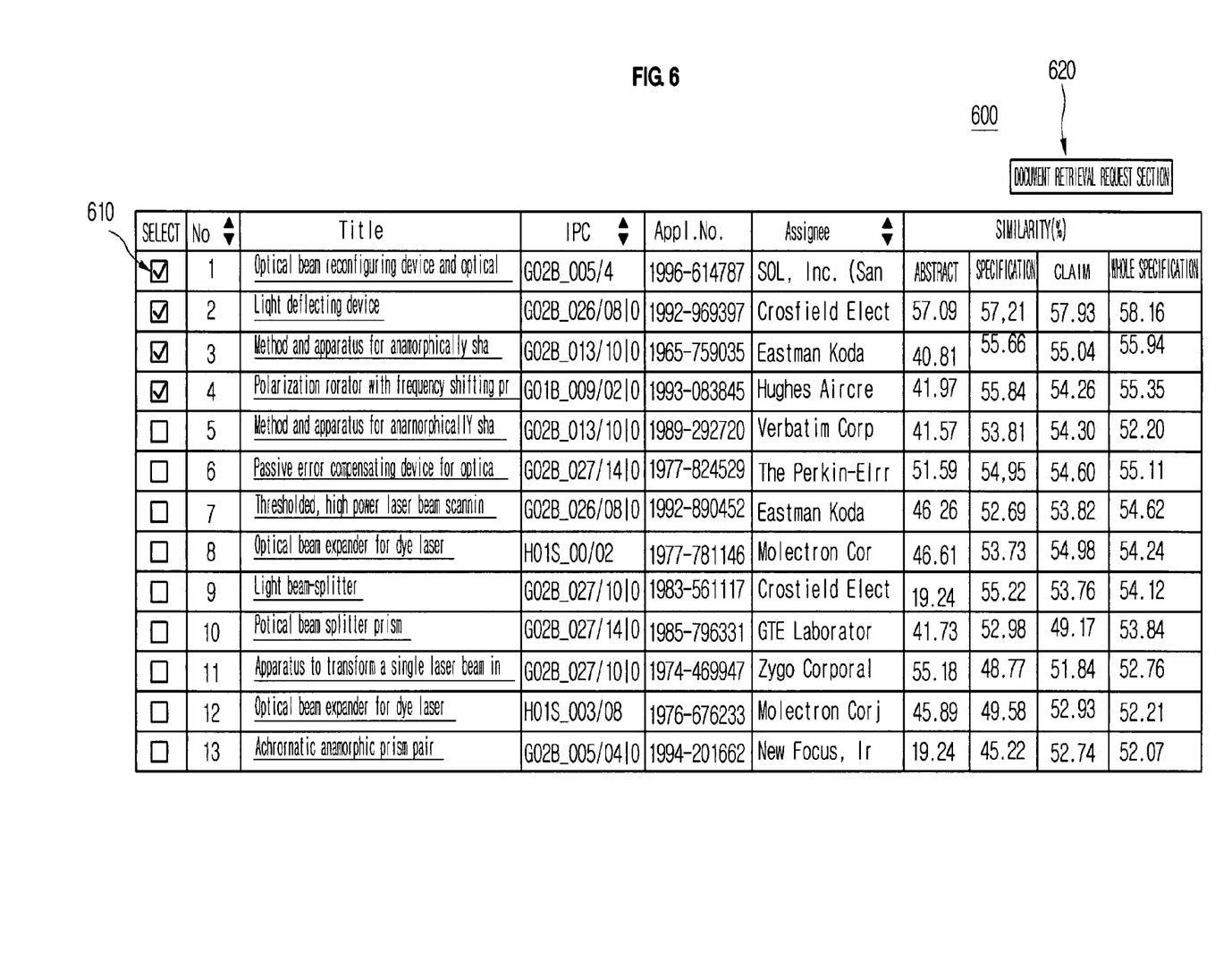
FIG. 6 is a view illustrating a second user interface as a retrieving list of similar documents for a query input by a user.

FIG. 6 illustrates a retrieving list of similar documents for a query input by a user.

The retrieval result list illustrated in FIG. 6 represents similar documents actually retrieved by the retrieval system 100 for the query in sentence units illustrated in FIG. 3.

A user may retrieve another similar documents using the retrieval result list, regardless of whether it is the retrieval result of the similar documents for the query input through various routes or the retrieval result of documents including a specific keyword according to the present invention.

When predetermined documents are listed as illustrated in FIG. 6, a user may check specific documents, and may retrieve documents having a predetermined similarity with respect to the checked documents.

In the present invention, a user interface provided to a user to retrieve another similar documents using the retrieved document list may be referred to as a second user interface 600. The second user interface 600 includes a document select section 610 and a document retrieval request section 620. The document select section 610 allows a user to select a specific document from the retrieved document list. A user may require retrieval for similar documents to the selected documents using the document retrieval request section 620.

The second user interface 600 provided to a user by the output unit 180 of the retrieval system 100 will now be described in detail.

A patent document such as a laid-open patent document and a registered patent document includes a text standardized to easily classify items constituting a specification, and the items include 'Title', 'Inventor', 'Application Number', 'Patent Number', 'Date of Patent', 'ABSTRACT', 'BACKGROUND OF THE INVENTION', 'BRIEF DESCRIPTION', 'DESCRIPTION OF THE PREFERRED EMBODIMENTS', 'Claim', and the like.

Some items of the items constituting a patent document may be displayed to a user as illustrated in FIG. 6. In particular, a predetermined percentage is shown for 'ABSTRACT', 'DESCRIPTION OF THE PREFERRED EMBODIMENTS', 'Claim', and 'whole specification' in FIG. 6.

In the retrieval system 100 of the present invention, the similarity of each document is calculated according to an occurrence frequency of a query input by a user and a similar word (or a related term) with respect to the query in each document, and a process of retrieving the occurrence frequency of the query and the similar word is performed for items constituting the document.

That is, the occurrence frequencies of the query input by a user and the similar word in the document may be calculated for 'ABSTRACT', 'DESCRIPTION OF THE PREFERRED EMBODIMENTS', 'Claim', and 'whole specification' of the document, respectively.

For this, the index files written by the document feature writing unit 120 are written for 'Title', 'Inventor', 'Application Number', 'Patent Number', 'Date of Patent', 'ABSTRACT', 'BACKGROUND OF THE INVENTION', 'BRIEF DESCRIPTION', 'DESCRIPTION OF THE PREFERRED EMBODIMENTS', and 'Claim' constituting a patent document, respectively.

Hereinafter, an operation of the retrieval system 100 will be described, when a user selects a specific document, and inputs the document retrieval request section 620 in order to retrieve documents similar to the selected documents.

This will be described in detail with reference to FIGS. 1 and 7.

The keyword extraction unit 163 extracts keywords from the documents selected by a user, with reference to the dictionary DB 170 as described above (S701).

The weighting unit 162 assigns a weight or an evaluation value to each keyword extracted by the keyword extraction unit 163 (S702).

Here, the weight assigned by the weighting unit 162 may be an occurrence frequency of each keyword in the selected document. For example, occurrence frequencies of keywords A, B, C, D, E, F, and others may be 7%, 6.5%, 5%, 4%, 3%, 2%, and less than 1%, respectively.

In this case, similar documents are retrieved mainly for keywords (for example, keywords A, B, and C) having a predetermined occurrence frequency (for example, 5%) or higher (S703). Here, the value of the occurrence frequency used for selecting the keywords A, B, and C may be changed by an administrator of the retrieval system 100.

The retrieval of the similar documents of S703 is performed by the document retrieving unit 161 of the similar document retrieving part 160, and the document retrieving unit 161 may refer to the index files stored in the document feature DB 130.

When the documents including the keywords A, B, and C are retrieved using the index files stored in the document feature DB 130, the documents having a weight similar to weights of the keywords A, B, and C will be a document having a high similarity.

In embodiments of the present invention, the keywords A, B, and C (keywords having an occurrence frequency of 5% or higher) may be main keywords, and the keywords D, E, and F (keywords having an occurrence frequency of 1% or higher and lower than 5%) may be sub keywords However, such a classification of the keywords may be changed.

The similarities of the documents retrieved by the document retrieving unit 161 are calculated from the occurrence frequencies of the keywords A, B, C, D, E, and F (S704).

In detail, similar documents are retrieved using the keywords A, B, and C having a predetermined or higher weight, and then the occurrence frequencies for the keywords A, B, C, D, E, and F of each of the retrieved documents are calculated.

Next, occurrence frequencies of the keywords D, E, and F are calculated for the documents retrieved using the keywords A, B, and C.

In brief, similar documents are retrieved from the documents stored in the document DB 110 using the keywords A, B, and C, and then the similarity of the retrieved similar documents are calculated using the keywords A, B, C, D, B, and F.

Weighting by tf*idf scheme generally used in a retrieval method based on an incomplete matching model may be used in calculation of the similarity. A document has a high similarity as it has an occurrence frequency similar to weights of the main keywords A, B, and C, and the document having an occurrence frequency similar to the sub keywords D, E, and F among them will be a document having the highest similarity.

Next, the retrieved similar documents are rearranged according to the similarity (S705), and the rearranged documents are provided to a user through the output unit 180.

Figure 7:
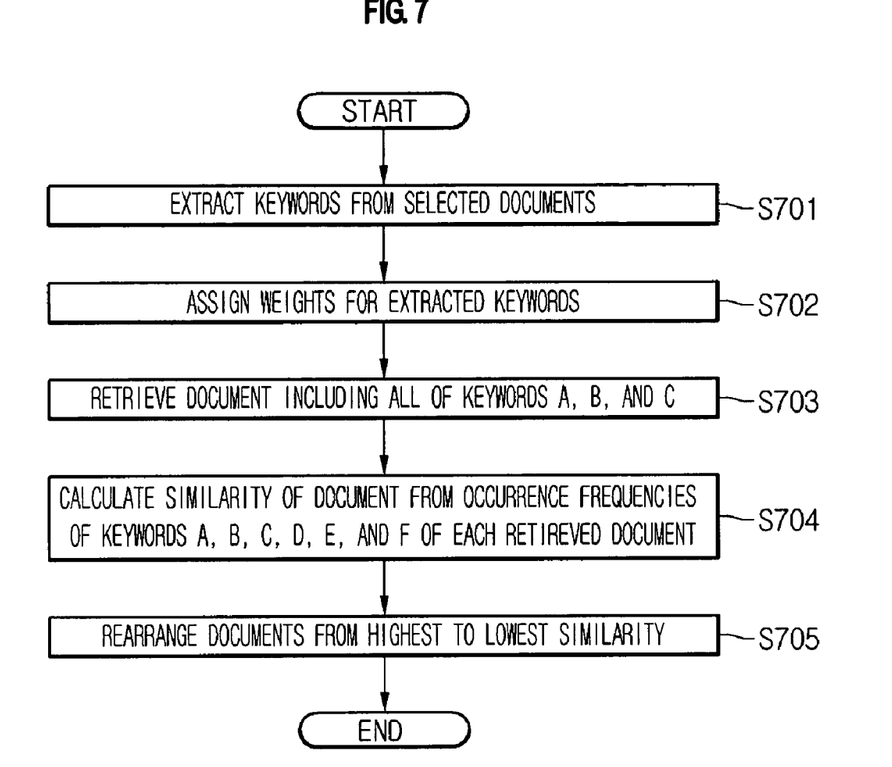
FIG. 7 is a flowchart for illustrating a method of retrieving similar documents using retrieved documents.

The document retrieval for the query in sentence units is performed with reference to FIG. 5, and the similar document retrieval with respect to the documents of the retrieval result is performed with reference to FIG. 7. However, the two retrieval methods may be compound properly by an administrator of the retrieval system, and should not be limited thereto.

Next, when a user may attach a text file, a process of retrieving documents similar to the attached file will be described.

Figure 8:
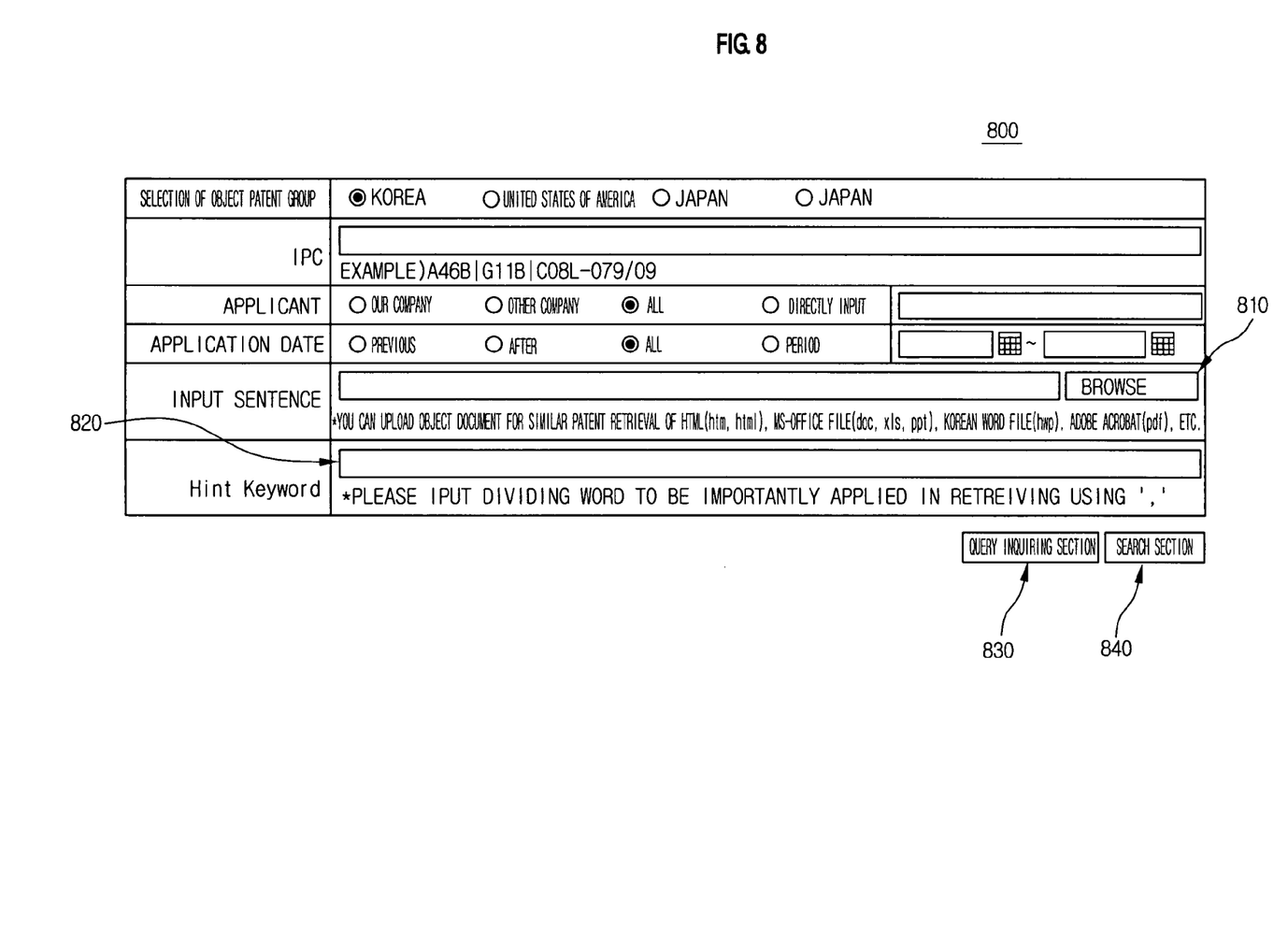
FIG. 8 is a view illustrating a third user interface according to an embodiment of the present invention.

The present retrieval process is different from the above-described processes in an input route of a query. That is, the output unit 180 of the retrieval system 100 provides a third user interface 800 to a user so as to attach a text file.

FIG. 8 illustrates the third user interface 800 provided to a user according to an embodiment of the present invention. The third user interface 800 includes an attachment section 810 for allowing a user to attach a file.

In order to limit a format of a file attached through the attachment section 810, the query input unit 190 of the retrieval system 100 may be set to receive only files of a specific format.

The query input unit 190 is set to monitor a format of the attached or uploaded file to receive only files of a specific format.

That is, the query input unit 190 is set to receive only morphologically analyzable files such as an HTML (htm, html), an MS-Office file (doc, xls, ppt), a Korean word file (hwp), and an Adobe Acrobat (pdf), such that the keyword extraction unit 163 of the similar document retrieving part 160 may extract keywords.

Therefore, when a user attaches a jpg file through the attachment section 810, the query input unit 190 blocks to receive the attached file, and the output unit 180 may display an error message to a user.

A query inquiring section 830 is provided such that a user can inquire keywords extracted from the attached file and respective weights of the respective keywords when a file of a format that the query input unit 190 can receive is attached, and the query inquiring section 830 performs the same function as that of the query inquiring section 830 illustrated in FIG. 3.

Similarly, when a user inputs the query inquiring section 830, a plurality of keywords and weights for the keywords are display as illustrated in FIG. 4.

The third user interface 800 further includes a search section 840 allowing a user to request retrieval of similar documents using keywords extracted from the attached file and weights of the keywords. Also, a hint input section 820 is provided to assign a weight higher than a predetermined value for a predetermined input keyword, as illustrated in FIG. 3.

Here, a process of extract keywords from the attached file is important, extraction of a similar word for the extracted keywords and retrieval of similar documents are same as the above-descriptions.

Figure 9:
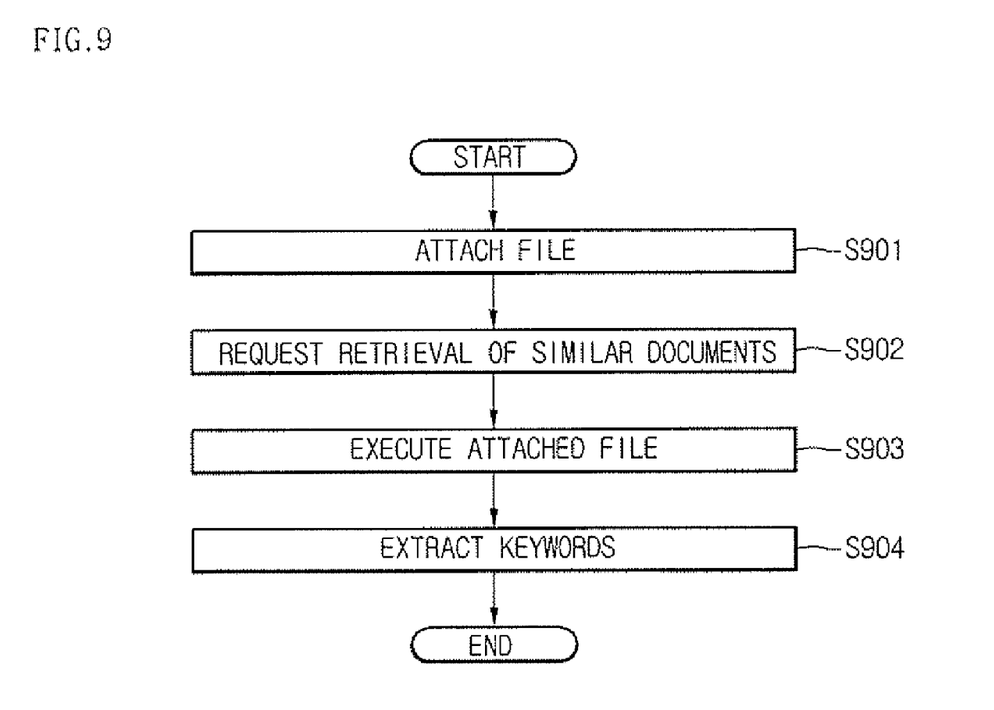
FIG. 9 is a flowchart for illustrating a process of extracting keywords from an attached file.

A process of extracting keywords from the attached file will be described with reference to FIGS. 1 and 9.

A user attaches (or uploads) a morphologically analyzable file through the third user interface 800 provided through the client 200 (S901).

When a user requests retrieval of similar documents by inputting the search section 840 formed in the third user interface 800 (S902), the attached file is executed (S903).

For this purpose, a plurality of programs are stored in the retrieval system 100, and the stored programs may be limited to programs that can execute an HTML (htm, html), an MS-Office file (doc, xls, ppt), a Korean word file (hwp), and an Adobe Acrobat (pdf).

In this context, the query input unit 190 receives only morphologically analyzable files.

When the attached file is executed by the retrieval system 100, the output unit 180 controls the execution result such that it is not provided to the client 200.

That is, in the process of extracting keywords from the attached file, the output unit 180 depends upon the query input unit 190 and the keyword extraction unit 163, and prevents the result image according to the execution of the file from being provided to a user while the attached file is executed.

Next, the keyword extraction unit 163 extracts keywords. The keywords extraction unit 163 skips contents of a format except for a text, such as jpg, jpeg, bmp, and the like, and extracts keywords for morphologically analyzable characters (S904).

Here, the keyword extraction unit 163 extracts keywords with reference to the dictionary DB 170 as illustrated above, and thus detailed descriptions thereof will be omitted.

Weights may be assigned to the keywords extracted through the above-described process using their occurrence frequencies, and similar words of the keywords extracted through the similar word DB 150 may be extracted, too.

Similar documents stored in the document DB 110 are retrieved using the keywords and the similar words based on the index files stored in the document feature DB 130, as described above.

A user can input a query through various routes according to the embodiments of the present invention.

That is, a user can copy a predetermined sentence recorded in Internet or an electronic document and input the sentence in the sentence input section 310 illustrated in FIG. 3 to retrieve documents similar to the input sentence.

Also, a user can select specific documents from the retrieved similar documents to retrieve documents similar to the selected documents.

Also, a user can attach a text file to retrieve documents similar to the texts recorded in the file.

In addition, a user interface provided to a user for such a retrieval make a document retrieval of a user more convenient.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A computer device for retrieving a document, the computer device comprising:
   a memory storing a document to establish a document database;
   a processing unit comprising:
   a document feature writing unit extracting attribute information of the document stored in the document database and generating an index information for the document based on the attribute information, the index information being stored in the memory to establish a document feature database;
   a query input unit receiving a query input that includes at least a portion of a document and at least one or more hint keywords inputted by a user;
   a keyword extraction unit extracting one or more keywords from the at least the portion of the document and the at least one or more hint keywords inputted by the user;
   a weighting unit assigning a weight to the extracted keyword using the index information and the weighting unit assigning higher weight to the one or more hint keywords inputted by the user than the extracted one or more keywords from the at least the portion of the document;
   a document retrieving unit retrieving a similar document using the one or more keywords with the assigned weight and at least one of classificational information, regional information, subject information, time information and the one or more hint keywords inputted by the user that is assigned higher weight than other keywords;
   an output unit outputting the similar document retrieved by the document retrieving unit to the user; and
   a similar word extraction unit extracting a plurality feature keywords for each stored document using the index information, selecting at least two feature keywords from the extracted feature keywords in accordance with an evaluation value of the keyword and clustering the selected feature keywords as similar words, wherein the document retrieving unit retrieves the similar document using the clustered similar words in addition to the keyword extracted from the query.

2. The computing device according to claim 1, wherein the document feature writing unit obtains a text from documents stored in the document database to generate the index information based on an occurrence frequency of each keyword.

3. The computing device according to claim 1, further comprising:

wherein the evaluation value is an occurrence frequency of the feature keyword for each document.

4. The computing device according to claim 1, wherein the memory stores the similar words to establish a similar word database and the document retrieving unit retrieves the similar documents with reference to the similar word database.

5. The computing device according to claim 1, wherein the output unit provides various kinds of user interface to a client connected through a network, and the user interface is an environment where a user inputs a query through various routes, and includes one of a first user interface where a query is input in sentence units, a second user interface where retrieved documents are used as a query, and a third user interface where a query is input by attaching or uploading a text file.

6. The computing device according to claim 5, wherein, when a user attaches or uploads a predetermined file using the third user interface, the query input unit monitors a format of the attached or uploaded file to receive only a file of a specific format that is morphologically analyzable.

7. The computing device according to claim 1, wherein the weight assigned to each keyword by the weighting unit is provided to a user through the output unit, and the provided keyword and the assigned weight are modifiable.

8. A method for retrieving a document performed in a computer device, the method comprising:

storing a document to establish a document database;

extracting attribute information of the document stored in the document database and generating an index information for the document based on the attribute information;

receiving a query input that includes at least a portion of a document and at least one or more hint keywords inputted by a user;

extracting one or more keywords from the at least the portion of the document and the at least one or more hint keywords inputted by a user;

assigning a weight to the extracted keyword using the index information and assigning higher weight to the one or more hint keywords inputted by the user than the extracted one or more keywords from the at least the portion of the document;

retrieving a similar document using one or more keywords with the assigned weight and at least one of classificational information, regional information, subject information, time information and one or more hint keywords inputted inputted by the user that is assigned higher weight than other keywords, outputting the retrieved similar document to the user;

extracting a plurality feature keywords for each stored document using the index information, selecting at least two feature keywords from the extracted feature keywords in accordance with an evaluation value of the keyword and clustering the selected feature keywords as similar words, wherein the step of retrieving the similar document comprises retrieving the similar document using the clustered similar words in addition to the keyword extracted from the query.

9. The method according to claim 8, wherein one of a first user interface where a query is input in sentence units, a second user interface where retrieved documents are used as a query, and a third user interface where a query is input by attaching or uploading a text file is provided to a user by an output unit providing a user interface, before the receiving of the query input by a user through the query input unit.

10. The method according to claim 9, wherein, when a user attaches or uploads a predetermined file using the third user interface, the query input unit monitors a format of the attached or uploaded file to receive only a file of that is morphologically analyzable.

* * * * *